Aug. 5, 1952 — P. Z. ANDERSON — 2,606,020
TORSION TRANSMITTING MOUNTING FOR TORSION MEMBERS SUCH AS RODS AND SPRINGS
Filed May 23, 1950 — 2 SHEETS—SHEET 1
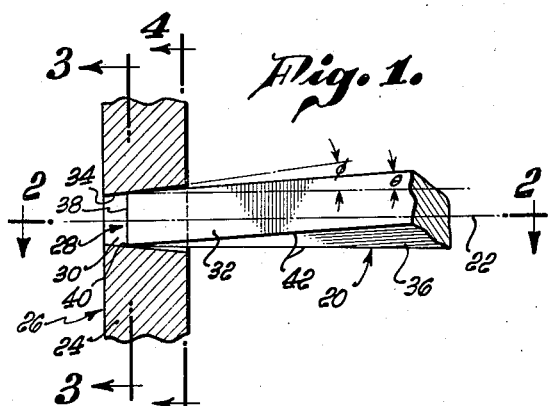
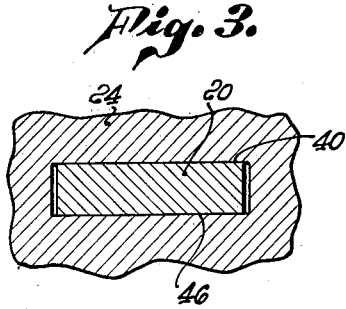
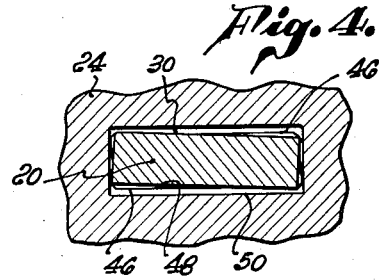
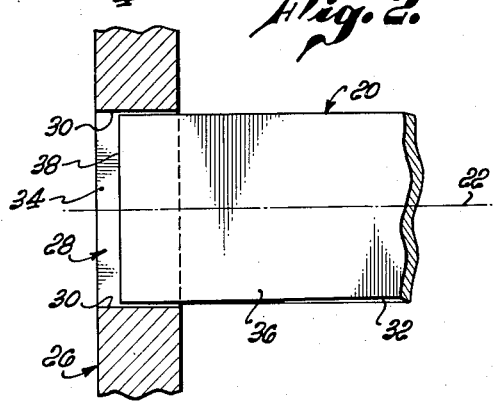
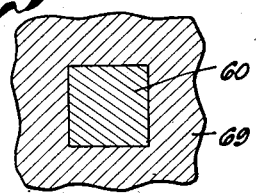
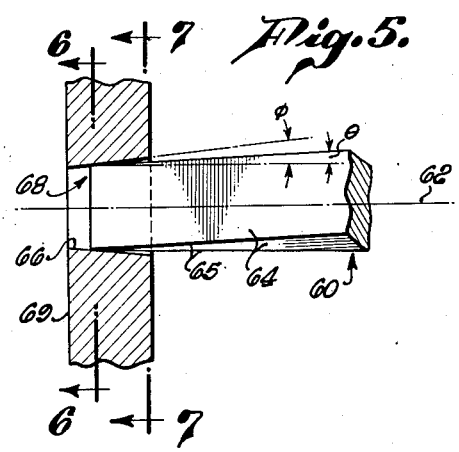
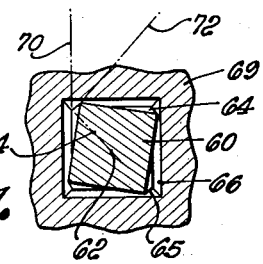
PAUL Z. ANDERSON, INVENTOR.
BY Buckelow & Shacklebury
ATTORNEYS.

Aug. 5, 1952  P. Z. ANDERSON  2,606,020
TORSION TRANSMITTING MOUNTING FOR TORSION MEMBERS
SUCH AS RODS AND SPRINGS
Filed May 23, 1950  2 SHEETS—SHEET 2
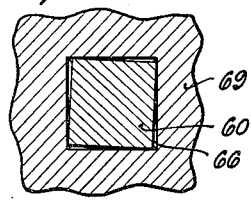
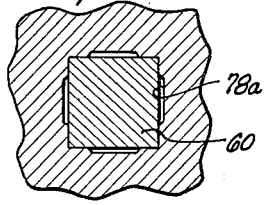
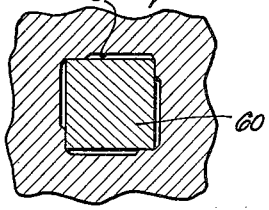
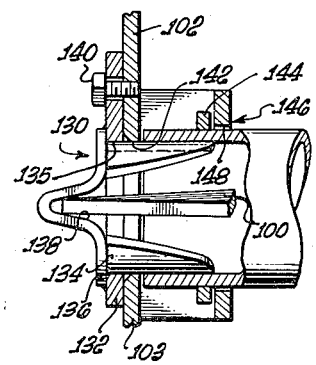
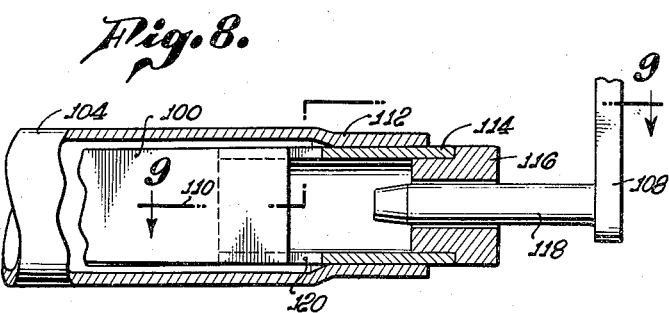
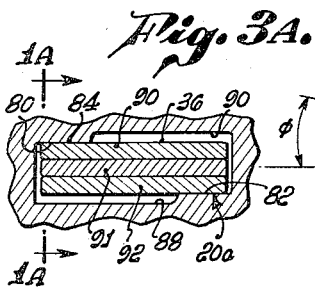
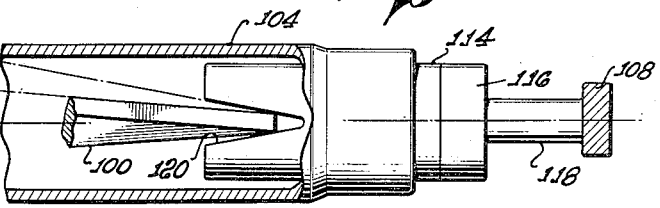
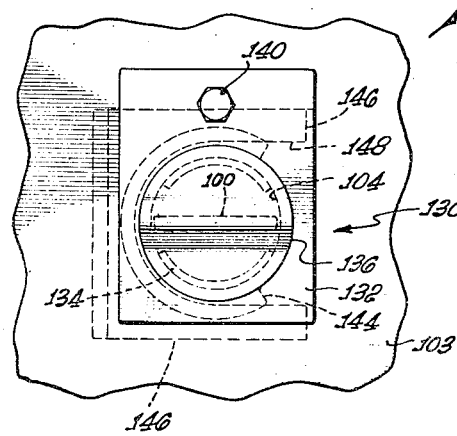
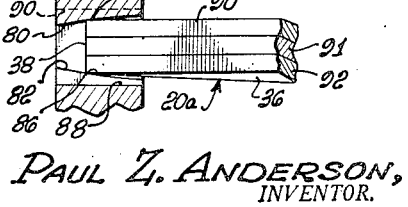
PAUL Z. ANDERSON,
INVENTOR.
BY
Bartelow & Sawtlebury
ATTORNEYS.

Patented Aug. 5, 1952

2,606,020

UNITED STATES PATENT OFFICE 2,606,020

TORSION TRANSMITTING MOUNTING FOR TORSION MEMBERS SUCH AS RODS AND SPRINGS

Paul Z. Anderson, Los Angeles, Calif., assignor to Preco Incorporated, Los Angeles, Calif., a corporation of California Application May 23, 1950, Serial No. 163,776

9 Claims. (Cl. 267—57)

This invention is concerned generally with the transmission of torsional loads between mechanical members, and more particularly, between elongated torsion rods or springs and members with which they directly interact.

It is well known that a torsion rod or spring is particularly subject to failure from fatigue in the immediate neighborhood of torsion transmitting connecting structures. An important object of the present invention is the provision of a connecting structure for a torsion member by which that tendency to fatigue failure of the member is greatly reduced. The invention has the great practical advantage that it can be embodied in structures that are simple in form, that do not require unusual accuracy of workmanship and that are therefore economical to produce and both reliable and durable in use.

The invention is particularly, but not exclusively, effective in connection with torsion bars or springs having a uniform flat cross-section and terminating in a flat end wall normal to the longitudinal axis of the member. Torsional load may be transmitted to a torsion member of that general type through a pair of flat opposing surfaces that are adapted to engage opposite faces of the member in the manner of a clamp or socket. Such clamp or socket surfaces typically extend transversely all the way across the member faces, and vary greatly in dimension longitudinally of the member. That latter variation is of little practical importance, however, since even a clamp or socket of considerable longitudinal extent is mainly effective in the immediate neighborhood of the free working portion of the spring.

A characteristic common to such previous torsion transmitting structures is that the bearing surfaces effectively divide the torsion member longitudinally into two portions, a stressed working portion and an unstressed or idle portion. For example, if a clamp or socket structure is located near each end of the torsion member, which then serves to transmit torsional load from one such clamp structure to the other, the stressed working portion of the member is that which lies between the two clamp structures, while the portion between either end of the member and the effective inner end of the adjacent clamp structure is unstressed. Even if the end of the member does not project appreciably beyond the contact surface of the clamp (for example, if the member end is fully embedded in a closely fitting socket) it is still true that the extreme end portion of the member is virtually unstressed in torsion by comparison with its primary working portion.

Among torsion transmitting structures that have been proposed for the purpose of reducing fatigue failure of a torsion member, some have the effect of distributing the application of the load over an appreciable length of the member. That may be accomplished, for example, by inserting a rubber pad between the member and the fixture from which torsional load is applied. A further example is the structure proposed in U. S. Patent No. 2,016,753 in which a torsion rod of round section is tightly gripped, under a shrinking or force fit, by a socket that has an appreciable extent longitudinally of the rod. The rod is gripped most tightly by that portion of the socket farthest from the free working portion of the rod, and, immediately adjacent that working portion, the stress transmission is limited by permitting some frictional rotary movement of the rod within the socket. By distributing the application of load over an appreciable length of the rod, the force applied at any point, and hence the tendency to fatigue, is supposed to be reduced. The present invention employs a directly opposite procedure.

It has been discovered that fatigue failure of a torsion member is closely associated with the region of longitudinal transition within that member between torsionally stressed and unstressed portions. Although such regions of transition have been present, so far as is known, in all previous torsion transmitting structures, their importance has not been understood. The present invention virtually eliminates the particular type of fatigue failure that has been described by applying torsional loads to the torsion member in a manner that avoids the production in that member of any zone of longitudinal transition between torsionally stressed and unstressed portion. That is accomplished by providing a novel type of bracket structure by which torsional load is applied to the member only at its extreme ends. The entire length of the member is thus almost uniformly stressed in torsion. The invention substantially eliminates the unstressed end portions of the member that were present in all previous structures, and particularly in those structures that distributed the application of load longitudinally of the member. Since the entire length of the member from one end to the other is substantially uniformly stressed, there is no point at which the member is particularly subject to fatigue.

In order to give a clear understanding of the invention, and of the great variety of specific structures in which it may be embodied, certain illustrative embodiments will be described in detail. The scope of the invention is not intended to be limited by any particular features of those typical embodiments, or of the accompanying drawings, which form a part of the ensuing description, and in which:

Fig. 1 is a fragmentary side elevation of a typical torsion member of flat cross section, showing in section a simple form of bracket in accordance with the invention;

Fig. 1A is a section similar to Fig. 1, but taken on line 1A—1A of Fig. 3A and showing a modification;

Fig. 2 is a longitudinal section on line 2—2 of Fig. 1;

Figs. 3 and 4 are transverse sections on lines 3—3 and 4—4, respectively, of Fig. 1;

Fig. 3A is similar to Fig. 3, but shows a modification;

Fig. 5 is an elevation similar to Fig. 1, but showing a typical torsion member of regular polygonal cross section;

Figs. 6 and 7 are transverse sections on lines 6—6 and 7—7, respectively, of Fig. 5;

Fig. 6A is similar to Fig. 6, but shows the torsion member not fully seated in the bracket;

Figs. 6B and 6C are similar to Fig. 6, but show modifications;

Fig. 8 is a side elevation, partly in section, of a preferred embodiment of the invention;

Fig. 9 is a fragmentary longitudinal section on line 9—9 of Fig. 8; and

Fig. 10 is an end elevation, viewing the structure of Fig. 8 from the left.

In several of the drawings certain angles and spacings are exaggerated for clarity of representation.

In Figs. 1–4, an elongated torsion member of uniform flat rectangular cross section is represented at 20, the longitudinal axis of the member being indicated at 22. An illustrative torsion transmitting bracket in accordance with the invention is shown at 26, comprising a plate 24, provided with a socket 28 in the form of a generally rectangular slot adapted to receive the end of member 20. The end walls 30 of socket 28, as illustrated, are parallel and are sufficiently widely spaced to provide ample clearance for the edge faces 32 of the torsion member, so that contact of those faces with socket walls 30 serves primarily to position the member relative to the bracket and does not transmit any appreciable stress.

The side walls 34 of socket 28 are oblique with respect to each other and to axis 22, the interwall spacing decreasing toward the interior of the socket in the direction in which member 20 is insertable (from right to left in Fig. 1, for example). The end of torsion member 20 is inserted into the relatively wide mouth of slot 28 until the converging side walls 34 of the slot engage the side faces 36 of the member. Because of the oblique relation between socket walls 34 and member faces 36, that engagement is limited to the extreme end portions of faces 36, that is, to those portions immediately adjacent the end edges 40 that are formed at the intersection of side faces 36 and end face 38 of the member. When torsional load is transmitted to the member from the socket walls by means of that limited engagement, the entire load may be considered to be applied to the member virtually in the plane of its end face 38. Hence the working portion of the member, that is, the portion that is torsionally stressed, includes the whole of the member, right up to its end.

It is to be understood, of course, that torsion transmission between two members is a mutual relation, and that whenever torque is transmitted in one direction, an equal and opposite torque opposes from the other direction. However, for the sake of simplicity and clarity of expression, it is often convenient to refer explicitly only to load transmission in one direction.

When a torsional load is applied to such a member as 20, the member is ordinarily deformed in the manner indicated in the figures, the side edges being twisted into the form of helices about axis 22. The helix angle of the deformed edges, represented approximately (see below) by the angle $\theta$ in Fig. 1, ordinarily has a definite maximum value in any particular mechanism, that value being determined by the maximum value of the torsional stress that member 20 is required to carry, or is capable of carrying without permanent deformation. In accordance with the invention, the torsion transmitting side walls of socket 28 form an angle $\phi$ with member axis 22 (Fig. 1) that is greater than the maximum value of helix angle $\theta$. By satisfying that condition, it is possible to insure that even when member 20 is fully stressed, contact with socket walls 34 will be limited, in the manner already described, to the extreme end portions of the side faces 36 of the member.

The effect of that condition is illustrated in Figs. 3 and 4, in which 46 represents the substantially line contacts between the side faces of member 20 and the side walls of the socket, those contacts being substantially limited to the plane of the end face of the member. Fig. 4 shows at 48 a transverse section of bar 20 at a point spaced from its end but still within socket 28, the oblique angle of that section, caused by torsional strain of member 20, being somewhat exaggerated for clarity of representation. The section of the socket aperture in the plane of section 48 is indicated at 50, and is seen to be wide enough, due to the divergence of the socket side walls, to clear the torsion member even in the deformed condition of the latter.

The torsion member may be of non-uniform section. In particular, if the ends of side faces 36 are slightly bevelled, so that they are not parallel to axis 22 where they intersect end face 38, the angle $\phi$ of socket walls 34 is increased accordingly. Corresponding remarks are applicable to other embodiments of the invention, and do not require detailed explanation. Further, it is to be understood that limits set by the present invention upon the angle of the socket walls relate only to those bearing portions of the walls that actively engage the torsion member. Although the walls 34 are shown flat for clarity of illustration, and although it is often preferable to form them in that manner, the wall surface may alternatively be curved (compare slot 138 in Fig. 8) or may be discontinuous in non-contact areas.

Figs. 5–7 illustrate a preferred manner of carrying out the invention in connection with a torsion member 60 of square section, which is broadly typical of the great variety of sections characterized as polygonal, whether regular or not. (The flat section of member 20 can properly be considered, for many purposes, as a special polygon having only two sides, the edge faces 32 of the member having no further function than to space apart the side faces 36.) In the illustrative embodiment of Figs. 5-7, the four side faces 64 of member 60 are all equivalent, and the side walls 66 of socket 68 in plate 69 are preferably also equivalent, so that the extreme end portions of the member sides are uniformly engaged, as indicated in Fig. 6. Each socket wall 66 forms with the axis 62 of member 60 an angle $\phi$, which is the pyramidal angle of the socket. In accordance with the invention, angle $\phi$ is greater than the angle $\theta$, shown in Fig. 5.

Angle $\theta$ is not the true helix angle as the latter is ordinarily defined, but is the projection of the helix angle in a plane normal to a side face of the member. For a member whose section is a regular polygon of $n$ sides, angle $\theta$ equals the true helix angle $\theta'$ of a side edge multiplied by sine $(360°/2n)$. For example, angle $\theta$ of Fig. 5 lies in the plane normal to the upper face of member 60, that plane being indicated by the line 70 in Fig. 7. The true helix angle $\theta'$, on the other hand, lies in the plane indicated by line 72, that plane being normal to a radius 74 drawn from axis 62 to the side edge of member 60. It will be seen that the projection upon plane 70 of the helix angle lying in plane 72 is the product of the helix angle by the cosine of the angle between the two planes $$\left(90° - \frac{360°}{2n}\right)$$

or by the sine of the complement of that angle, $$\frac{360°}{2n}$$

In the special case of a flat torsion member (Figs. 1-4) having a width very much greater than its thickness, the helix angle of a side edge lies substantially in a plane normal to the side face. Hence the difference between $\theta$ and the true helix angle $\theta'$ is of little practical importance. (That result follows also from the formula given above, if the flat section is viewed as a two-sided polygon, since for $n=2$, sine $(360°/2n)$ is unity.)

In the present description and claims, the angle $\theta$ may be defined as the projection of the helix angle of a side edge of a torsion member in a plane normal to that side, and will be referred to as the "effective helix angle" for that side of the member. For a member of non-regular section the effective helix angle may be different for different sides. In actual practice such distinctions are often of minor importance, since for practical reasons the oblique angle $\phi$ of the socket faces is preferably relatively large compared to the effective helix angle $\theta$. However, the relationships described are helpful to an understanding of the principles upon which the invention depends.

Although it is generally preferred to provide bracket engagement along the whole of an end edge of each of the working sides of a torsion member, as indicated, for example, in Figs. 3 and 6, that is not necessary. For example, if torsion member 60 is withdrawn slightly from the position in socket 68 shown in Figs. 5 and 6, a condition is produced such as is shown in Fig. 6A, which otherwise corresponds to Fig. 6. Working contact is then not only limited to the extreme end portion of each face of member 60, but is limited also to that end portion of each face that is adjacent one of its side edges.

Torsion can be transmitted to a member by facial contact with a face only if that face has appreciable radial extent with respect to the member axis. That is true, of course, of those portions of faces 64, for example, that are adjacent side edges 65, but is not true of the central portions of such faces. Since such central portions are relatively ineffective in transmitting torsion, such slight play as is indicated in Fig. 6A is ordinarily not objectionable. If the direction of the torsional load changes, there is, of course, a slight lost motion before contact is established at the other end of each end edge of the torsion member.

Further, it may be advantageous to relieve the central portion of each side wall of the socket (or of the torsion member), as indicated typically at 78a in Fig. 6B, thus insuring firm working contact along two definite portions only of each end edge of the torsion member. Each of those contact portions is, of course, effective for transmitting torque in only one sense. Hence the torsion member need not be held in its socket tightly enough to maintain actual contact of both portions. If torsion is to be transmitted in one direction only, a structure of the type indicated in Fig. 6C relieved as shown at 78 may be used. Although Figs. 6A, 6B and 6C, as drawn, correspond to Fig. 6 and thus represent a particular embodiment, it will be understood that corresponding modifications of the types indicated may be made also in other embodiments.

For example, if torsion in only one direction is to be transmitted to an end of a torsion member of flat section, such as member 20 of Figs. 1-4, it is sufficient to employ a bracket structure having only two bearing faces, which engage corresponding bearing areas located on the opposite flat faces of the member at points diagonally spaced transversely of the member and immediately adjacent its end face. An illustrative bracket of that type is indicated in Figs. 1A and 3A, which correspond generally to Figs. 1 and 3, already described. Surfaces 80 and 82 are the bearing faces of the bracket and engage diagonally opposite areas 84 and 86, respectively, of the faces 36 of member 20a.

As illustrated, member 20a comprises three distinct elements 90, 91 and 92, arranged in a stack and acting in many respects as a unitary torsion member. Thus bearing area 84 is part of the upper face of upper element 90 (as seen in Figs. 1A and 3A), while bearing area 86 is part of the lower face of lower element 92. Central element 91 receives its torsional load primarily immediately adjacent its end face from contact with elements 90 and 92. Throughout the present specification and claims the term torsion member is intended broadly to include any such aggregation of elements.

The bracket bearing faces 80 and 82 are inclined longitudinally of the member with respect to member bearing areas 84 and 86, in accordance with the invention at a sufficient angle to insure that even under full load the load transmitting engagement occurs only immediately adjacent end face 38 of the member.

The bracket faces 88 and 90, directly opposing bearing faces 80 and 82, may be of arbitrary shape and may be omitted altogether, since they do not necessarily engage the torsion member so long as it is subjected to load in only one direction. For example, as typically shown in Fig. 1A, bracket face 88 may be parallel to the longitudinal axis of the member. Alternatively, faces 88 and 90 may be omitted entirely from the bracket structure, particularly if some torsional load is always maintained to hold member 20 in position relative to the bracket. Under such conditions of unidirectional torque, the above described restrictions associated with the helix angle of the loaded member apply only to the actual working faces, such, for example, as bracket face 80 and member face 84 which it engages.

Bracket bearing faces 80 and 82, as illustratively shown, are cylindrically concave, with axes of curvature normal to the paper in Fig. 1A, and hence normal to the longitudinal axis of torsion member 20. If that form of bearing face is employed in the bracket structures at both ends of member 20, there is an advantageous tendency to maintain the member in an equilibrium longitudinal position. If the member is displaced toward one end, for example to the left in Fig. 1A, the angle of the working portions of faces 80 and 82 become more steeply inclined with respect to member faces 84 and 86, increasing the longitudinal component of the force that is exerted upon member 20, and thereby tending to move the latter back to the right and to restore the equilibrium condition. The equilibrium position is that for which (other things being equal) the effective contact angles between bracket and member bearing faces at both ends of the member are equal.

Any suitable alternative means may be employed to confine the torsion member longitudinally, such for example, as abutments forming parts of the mounting brackets and adapted to engage the opposite end faces of the member. Although it is preferred, for transmitting load, to provide generally symmetrical pairs of bearing formations, both of which are in accordance with the invention (as at 80 and 82 of Figs. 1 and 3A, for example), the invention may alternatively be employed with respect to only one bearing formation of such a pair, the other formation being of arbitrary form. For that viewpoint, the engagement between faces 80 and 84 may be considered illustrative of the invention, faces 82 and 86, together with suitable mounting and torque-transmitting means at the opposite end of member 20, being considered collectively as means for confining member 20 with respect to the bracket structure in such a manner as to maintain the engagement at 80, 84.

Although the invention is useful for transmitting torsional loads to torsion members of many types, the advantages derivable from the described structures are particularly important in connection with torsion springs. The expense of providing a torsion spring that will produce a yielding torque of given characteristics ordinarily decreases sharply as the specific loading of the spring is increased. Since, in previous practice, the principal limit upon the feasible loading of torsion springs was the danger of failure from fatigue near the points of application of the torsional load, the great practical importance of the invention in reducing that danger is obvious.

Figs. 1-7 and the accompanying description have dealt explicitly with torsion transmission at only one rod end. The other end of the torsion member may be held or mounted in any manner appropriate to the mechanism in which the torsion rod is used; that holding or mounting preferably holding the rod longitudinally in the socket. Typically, the other end can be held in the same manner as has been described, each mounting then may serve partially or wholly to position the rod longitudinally with respect to the other mounting.

Figs. 8-10 illustrate a typical embodiment of the invention in the mounting of a torsion spring for the purpose of producing a yielding torque between two mechanical elements. The left hand end of torsion spring 100, as seen in Fig. 8, is confined rotationally with respect to a plate 102, which may be considered for purposes of illustration to represent a fixed part of a machine frame. The right hand end of spring 100 is confined with respect to the tube 104, which coaxially surrounds the spring, and which is rotatably mounted with respect to frame plate 102 and a bracket 108 for rotation about the longitudinal tube axis 110. The spring thus provides a torsionally yielding connection between tube 104 and the machine frame, and establishes between them an equilibrium rotational position. If the tube is rotationally displaced relative to the frame from that equilibrium position, a yielding torque opposing that displacement is exerted on both elements by spring 100. The utility of structures of that general type does not require elaboration, but is illustrated typically in the copending patent application of Paul K. Beemer, Ser. No. 162,198, filed on May 16, 1950, now Patent No. 2,567,504, issued September 11, 1951, and entitled Driving Mechanism for Accessories in Transport Vehicles. In the particular mechanism there described, plate 102 and bracket 108 are mounted on the underframe of a freight car with plate 102 approximately in the plane of a side wall of the car and tube 104 extending inwardly of the car parallel to the running gear axles. The yielding torque exerted by spring 100 upon tube 104 is typically employed (by means not shown in the present application) to maintain yielding contact between a power transmitting roller and the rim of a car wheel for transmitting power from the wheel to an auxiliary machine mounted on the car.

Tube 104, which serves as a shield and support for spring 100, as well as transmitting torque from the spring, is slightly reduced in diameter at 112 at its spring-connected inner end, and is provided with an internal stub sleeve 114, the protruding end of which is closed by an axially bored plug 116. The sleeve and preferably also the plug are rigidly fixed to tube 104, as by welding. A spindle 118, rigidly mounted on fixed bracket 108, freely enters the bore of plug 116 and serves as a bearing for the tube assembly, about which the latter is freely rotatable.

The edge portions of the inner end of spring 100 enter V-shaped, axially extending notches 120, placed diametrically oppositely in sleeve 114. As indicated best in Fig. 9, the side walls of those notches form with the tube axis 110 an angle $\phi$ that is greater than the maximum effective helix angle $\theta$ of a side face of the spring. Hence, even when fully twisted, the spring is engaged by sleeve 114 only immediately adjacent the end edges that are formed by intersection of the spring end face with the spring side faces. Because sleeve 114 is hollow, contact is limited to the outer portions of those end edges of the spring. Thus sleeve 114 is an example of the broad type of relieved spring socket illustrated in Fig. 6B.

A bearing for the outer end of tube 104 is provided by bracket assembly 130. As illustrated, that assembly is removably mounted on frame plate 102, and comprises four principal members rigidly connected, as by welding. Bracket plate 132 lies flatly against the outer face of frame plate 102, to which it is releasably connected in settable rotational position (about axis 110) as by a bolt or screw 140. Rotation of bracket 130 about axis 110, as for setting its position, is guided by two ears 134, which are fixedly set into a bore 135 in bracket plate 132, and which project in a sleeve-like formation from the inner face of that plate through a suitable bore 142 in frame plate 102. As illustrated, ears 134 are sufficiently spaced to clear spring 100, and comprise only a fragmentary sleeve. Alternatively, if the width of the spring is less than the inside diameter of the sleeve formation, the latter may be continuous and fully surround the spring. The inner ends of ears 134 extend inwardly of frame plate 102 and enter the outer end of tube 104, providing a bearing for that end of the tube.

The fourth member of bracket assembly 130 is a cap 136 which covers bore 135 in bracket plate 132. Cap 136 is folded to form an inwardly opening groove 138 of V-section extending diametrically across bore 135. That groove receives the outer end of torsion spring 100 in the manner clearly shown in Fig. 8, and forms a spring socket in accordance with the invention. As indicated in the figure, the walls of groove 138 need not be flat, but are so formed that those portions of the two walls which engage the spring (that is, the portions which are spaced apart by the spring thickness) lie at such an angle with respect to spring axis 110 that only the extreme end portions of the spring side faces are engaged. Those extreme end portions therefore comprise the bearing faces of the spring.

Tube 104 is axially confined with respect to frame plate 102, and hence with respect to bracket assembly 130, by contact of the outer tube end with the inner face of plate 102, on the one hand, and by contact of external tube flange 144 with the outer face of the bracket 146 that is rigidly mounted on plate 102, on the other hand. A U-shaped groove 148 in bracket 146 partially encloses the tube body (Fig. 10) and helps to define its position during assembly before bracket assembly 130 has been inserted into plate 102. To disassemble the apparatus, bracket assembly 130 and spring 100 are first removed, and tube 104 can then be swung about its inner bearing 116, which fits sufficiently loosely, until its outer end is free of bracket slot 148, and also free of the lower edge 103 of plate 102. The tube may then be moved axially outwardly to slip plug 116 off the end of spindle 118.

Axial location of tube 104 with respect to bracket assembly 130 determines the spacing between the two spring sockets, comprising groove 138 in cap 136 and the twin grooves 120 in sleeve 114. That spacing is preferably so determined that the spring will fit the sockets at both ends reasonably closely when unstressed. The slight shortening of the spring when torsional load is applied requires no special consideration, for the reasons discussed in connection with Fig. 6A. In fact, the variation in length to which a torsion spring is ordinarily subject when in use is much less than the axial tolerance that is entirely acceptable in the position of a spring end with relation to a socket constructed in accordance with the invention.

It is precisely because such relatively great dimensional tolerances are compatible with successful operation of the invention that it offers such remarkable utility. The advantages of heavier specific loads without reduction of actual working life are obtained with substantially no increase in production or maintenance cost.

I claim:

1. In combination, an elongated torsion member, and a bracket adapted to transmit a torsional load to the torsion member, the torsion member having a transverse end face generally normal to the longitudinal axis of the member, and having a plurality of bearing faces adjoining the end face and forming therewith radially extending end edges, and the bracket having a corresponding plurality of bearing faces that are respectively inclined longitudinally with relation to the corresponding bearing faces of the torsion member and that engage the latter faces only immediately adjacent the said end edges.

2. The combination defined in claim 1 and in which the torsion member has an end portion of regular polygonal section, and the bracket includes structure forming a hollow inwardly tapering regular pyramidal socket, the bearing faces of the torsion member comprising side faces of the said polygonal end portion, and the bearing faces of the bracket comprising internal side faces of the pyramidal socket.

3. In combination, an elongated torsion member, and a bracket adapted to transmit a torsional load to the torsion member, the torsion member having a transverse end face generally normal to the longitudinal axis of the member, and having a bearing face generally parallel to the said axis and adjoining the end face and forming therewith a radially extending end edge, and the bracket having a bearing face inclined with respect to the said axis and engaging the said bearing face of the torsion member only immediately adjacent the said end edge, and means confining the torsion member with respect to the bracket to maintain the said engagement of the bearing faces.

4. The combination defined in claim 3 and in which the bearing face of the bracket is cylindrically concave with its cylindrical axis transverse of the longitudinal axis of the member.

5. In combination, an elongated torsion member having an end portion of polygonal cross section terminating in a transverse end face that forms with the respective side faces of the member well defined end edges, a bracket engaging the said end portion of the torsion member for transmitting a torsional load thereto, said bracket including structure forming a hollow inwardly tapering pyramidal socket having side faces that correspond respectively to the side faces of the member, and means supporting the torsion member with its end extending coaxially into the socket of the bracket, the pyramidal angle of each side face of the socket being such that its engagement with the corresponding side face of the member is limited to that region of the latter face which immediately adjoins its end edge.

6. A mounting for an elongated torsion member having opposite end portions of polygonal cross section terminating in transverse end faces that form with the respective side faces of the member well defined radially extending end edges, said mounting comprising longitudinally spaced torsional load transmitting formations engaging the member at its respective ends, each formation including a plurality of concave bearing surfaces engaging the respective side faces of the member only immediately adjacent the said end edges, the plane tangent to each said bearing surface at its engagement with a side face of the member forming an acute angle with that face.

7. Means for transmitting a torsional load, comprising in combination an elongated torsion member having two longitudinal opposite side faces that directly adjoin an end face of the member, and a bracket engaging the member for transmitting a torsional load of predetermined maximum value to the member, said bracket including two spacedly opposed walls lying generally in respective planes that form an acute angle greater than the sum of the effective helix angles of the said longitudinal side faces of the torsion member when the latter is fully stressed, and means supporting the torsion member in such relation to the bracket that the longitudinal axis of the member lies within the said angle in a plane approximately normal to its vertex, and that the said walls of the bracket engage the opposite side faces of the torsion member only immediately adjacent its said end.

8. Means for transmitting a torsional load, comprising in combination an elongated torsion member of generally uniform flat section, and a bracket engaging one end of the member for transmitting a torsional load thereto, said bracket including a hollow tube of outside diameter approximately equal to the width of the member, a pair of oppositely disposed slots in the tube wall extending longitudinally of the tube from one of its ends, the width of the slots at the tube end being greater than the thickness of the member and decreasing longitudinally of the tube, and a sleeve confiningly enclosing the tube and member in coaxial relation, with the end of the member entering the slots in the tube.

9. Means for transmitting a torsional load as defined in claim 8, and in which the side walls of the slots in the tube form angles with the tube axis that are larger than the effective helix angle formed by a side edge of the fully stressed torsion member.

PAUL Z. ANDERSON.

REFERENCES CITED

The following references are of record in the file of this patent:

UNITED STATES PATENTS

| Number | Name | Date |
|---|---|---|
| 134,006 | Saladee | Dec. 17, 1872 |
| 252,825 | Wetmore | Jan. 24, 1882 |
| 405,547 | Gay | June 18, 1889 |
| 2,016,753 | Patzig | Oct. 8, 1935 |
| 2,213,004 | Hickman | Aug. 27, 1940 |

FOREIGN PATENTS

| Number | Country | Date |
|---|---|---|
| 519,524 | Great Britain | Mar. 29, 1940 |
| 543,733 | Great Britain | Mar. 10, 1942 |
| 904,514 | France | Mar. 5, 1945 |